(12) United States Patent
Nakamae et al.

(10) Patent No.: US 9,415,466 B2
(45) Date of Patent: Aug. 16, 2016

(54) CUTTING TOOL AND METHOD AND APPARATUS FOR MANUFACTURING THE SAME

(75) Inventors: Kazuo Nakamae, Itami (JP); Hiroyuki Murase, Itami (JP); Katsuko Yamamoto, Itami (JP); Mamoru Ono, Itami (JP); Katsuyuki Tanaka, Itami (JP); Toshimitsu Sakata, Itami (JP); Teruhiro Enami, Itami (JP); Yutaka Kobayashi, Itami (JP)

(73) Assignees: SUMITOMO ELECTRIC INDUSTRIES, LTD., Osaka (JP); SUMITOMO ELECTRIC HARDMETAL CORP., Hyogo (JP)

( * ) Notice: Subject to any disclaimer, the term of this patent is extended or adjusted under 35 U.S.C. 154(b) by 554 days.

(21) Appl. No.: 13/882,928

(22) PCT Filed: Sep. 16, 2011

(86) PCT No.: PCT/JP2011/071183
§ 371 (c)(1),
(2), (4) Date: Jun. 4, 2013

(87) PCT Pub. No.: WO2012/060162
PCT Pub. Date: May 10, 2012

(65) Prior Publication Data
US 2014/0054275 A1      Feb. 27, 2014

(30) Foreign Application Priority Data

Nov. 1, 2010   (JP) .................................. 2010-245426
Jul. 20, 2011  (JP) .................................. 2011-159195

(51) Int. Cl.
   *B23K 26/06*    (2014.01)
   *B23K 26/38*    (2014.01)
   (Continued)

(52) U.S. Cl.
   CPC ............ *B23K 26/0648* (2013.01); *B23D 65/02* (2013.01); *B23K 26/064* (2015.10);
   (Continued)

(58) Field of Classification Search
   CPC .... B23K 26/0648; B23K 26/38; B23K 26/40; B23K 26/06
   USPC ............. 219/121.68, 121.69, 121.67, 121.72, 219/121.82; 407/119
   See application file for complete search history.

(56) References Cited

U.S. PATENT DOCUMENTS 5,232,320 A *  8/1993  Tank ..................... B23B 51/00
                                                       407/118
6,353,204 B1 * 3/2002  Spaay ................... B23P 15/40
                                                       219/121.72
(Continued)

FOREIGN PATENT DOCUMENTS

CN    1473087 A       2/2004
EP    1023961 A1 *    8/2000
(Continued)

OTHER PUBLICATIONS

International Search Report for PCT/JP2011/071873 issued Dec. 20, 2011.
(Continued)

*Primary Examiner* — Samuel M Heinrich
(74) *Attorney, Agent, or Firm* — Ditthavong & Steiner, P.C.

(57) ABSTRACT

Provided is a technology for manufacturing cutting tools that is capable of providing cutting tools that have a cut surface whose surface is uniformly smooth and that have a stable performance. Provided are a cutting tool manufacturing method in which a cutting tool material is cut by using, as a laser beam, a laser beam formed by combining two linearly polarized laser beams so that the directions of polarization of the two linearly polarized laser beams are at right angles to each other; a cutting tool manufacturing method in which a circularly polarized laser beam is used as a laser beam; a cutting tool manufacturing method in which a randomly polarized laser beam is used as a laser beam; a cutting tool manufactured by the manufacturing method; a cutting tool manufacturing apparatus that includes means for generating a combined laser beam formed of two linearly polarized laser beams, the directions of polarization of the two linearly polarized laser beams being at right angles to each other and an optical system that guides the combined laser beam to the cutting tool material; a cutting tool manufacturing apparatus that includes means for generating a circularly polarized laser beam; and a cutting tool manufacturing apparatus that includes means for generating a randomly polarized laser beam.

10 Claims, 3 Drawing Sheets

(51) Int. Cl.
*B23K 26/40* (2014.01)
*B23D 65/02* (2006.01)
*B23K 26/08* (2014.01)

(52) U.S. Cl.
CPC ......... *B23K26/0613* (2013.01); *B23K 26/0823* (2013.01); *B23K 26/38* (2013.01); *B23K 26/40* (2013.01); *B23C 2226/125* (2013.01); *B23C 2226/315* (2013.01); *B23C 2260/56* (2013.01); *B23K 26/06* (2013.01); *B23K 2203/50* (2015.10); *Y10T 407/27* (2015.01)

(56) References Cited

U.S. PATENT DOCUMENTS

2004/0213639 A1 10/2004 Ueda et al.
2004/0234349 A1 11/2004 Ueda et al.

FOREIGN PATENT DOCUMENTS

| | | | |
|---|---|---|---|
| JP | 62-045491 | A | 2/1987 |
| JP | 62-176696 | A | 8/1987 |
| JP | 09-029467 | A | 2/1997 |
| JP | 09-206975 | A | 8/1997 |
| JP | 2000-219528 | A | 8/2000 |
| JP | 2003-25118 | A | 1/2003 |
| JP | 2004-066745 | A | 3/2004 |
| JP | 2004-344957 | A | 9/2004 |
| JP | 2006-096051 | A | 4/2006 |
| JP | 2007190633 | A * | 8/2007 |
| JP | 2008-229810 | A | 10/2008 |
| JP | 2010-120038 | A | 6/2010 |
| JP | 2010-172900 | A | 8/2010 |

OTHER PUBLICATIONS

Notification of the First Office Action for corresponding Chinese Application No. 201180052597.9, dated Nov. 2, 2014, 22 Pages.

* cited by examiner

(a) 12W, WAVELENGTH 532nm
PULSE WIDTH 20ns
10kHz (b) 5.6W, WAVELENGTH 532nm
PULSE WIDTH 90ns
6kHz

CUTTING TOOL AND METHOD AND APPARATUS FOR MANUFACTURING THE SAME

TECHNICAL FIELD

The present invention relates to a cutting tool that is made of a cutting tool material such as diamond and a method and an apparatus for manufacturing the cutting tool.

BACKGROUND ART

A cutting tool material such as diamond having high hardness and good wear resistance has been used for making cutting tools used for precise cutting. Such a cutting tool has a flank face, a rake face, and a cutting-edge ridgeline that is a ridge line along which the flank face and rake face intersect. Such a cutting tool is manufactured by cutting the cutting tool material by laser cutting (see, for example, PTL 1 to PTL 3).

CITATION LIST

Patent Literature

PTL 1: Japanese Unexamined Patent Application Publication No. 2003-25118
PTL 2: Japanese Unexamined Patent Application Publication No. 2004-344957
PTL 3: Japanese Unexamined Patent Application Publication No. 2008-229810

SUMMARY OF INVENTION

Technical Problem

However, there have been problems in that a cutting tool that is manufactured by employing a manufacturing method of the related art has a cut surface whose surface smoothness is insufficient and whose surface roughness is non-uniform, and the cutting tool's performance as a cutting tool is unstable.

Therefore, there has been a demand for a technology for manufacturing cutting tools that is capable of providing cutting tools that have a cut surface whose surface is uniformly smooth and that have a stable performance.

Solution to Problem

The inventors of the present invention conducted studies on the cause of insufficient surface smoothness and non-uniform surface roughness of a cut surface of a cutting tool of the related art. As a result of the studies, it was found that, in the case of laser cutting of the related art, a relationship between a scanning direction of a laser beam and a direction of polarization of the laser beam during cutting had affected the surface roughness of the cut surface.

More specifically, in the related art, a laser beam that is output as a linearly polarized laser beam has been used when laser cutting is performed on a hard material such as diamond, cBN, or a superhard material. However, since cutting has not been performed with consideration of the relationship between the scanning direction of the laser beam and the direction of polarization of the laser beam, the scanning direction of the laser beam has affected the surface roughness of a cut surface.

Consequently, the inventors of the present invention conducted further studies, and as a result, discovered that a cutting tool that has a cut surface whose surface is uniformly smooth and that have a stable performance can be provided and came up with the present invention.

According to the present invention, there is provided a cutting tool manufacturing method for manufacturing a cutting tool by cutting a cutting tool material into a predetermined shape by causing a laser beam to scan the cutting tool material, in which the cutting tool material is cut by using, as the laser beam, a laser beam formed by combining two linearly polarized laser beams so that the directions of polarization of the two linearly polarized laser beams are at right angles to each other.

In the related art, there have been differences in processing precision between a case in which a workpiece is processed by scanning the workpiece with a laser beam in a direction that is the same as a direction of polarization of linearly polarized light and a case in which the workpiece is processed by scanning the workpiece with a laser beam in a direction perpendicular to the direction of polarization of linearly polarized light. However, as described above, when a laser beam formed by combining two linearly polarized laser beams so that the directions of polarization of the two linearly polarized laser beams are at right angles to each other is radiated onto the workpiece, the polarized light laser beams, the directions of polarization of which are at right angles to each other, complement each other in terms of processing precision in scanning and processing of the workpiece. As a result, a certain level of processing precision can be obtained, and there is no need to consider the scanning direction of the laser beam for the workpiece. The workpiece can be processed at the certain level of processing precision by scanning with the laser beam in any direction through 360 degrees.

The above-described combined laser beam can be obtained by, for example, rotating the direction of polarization of the linearly polarized laser beam by 90 degrees by causing one of the two linearly polarized laser beams to pass through a λ/2 wave plate, and after that, causing the linearly polarized laser beam to be combined with the other linearly polarized laser beam.

According to the present invention, there is provided a cutting tool manufacturing method for manufacturing a cutting tool by cutting a cutting tool material into a predetermined shape by causing a laser beam to scan the cutting tool material, in which a circularly polarized laser beam is used as the laser beam.

Since the circularly polarized laser beam does not have a specific direction of polarization like the linearly polarized laser beams and the laser beam formed by combining the linearly polarized laser beams, the scanning direction of the laser beam can be easily adjusted. In addition, a cutting tool that has a cut surface having an appropriate uniform smoothness can be manufactured.

The above-described circularly polarized laser beam can be obtained by, for example, causing the combined laser beam to pass through a λ/4 wave plate.

According to the present invention, there is provided a cutting tool manufacturing method for manufacturing a cutting tool by cutting a cutting tool material into a predetermined shape by causing a laser beam to scan the cutting tool material, in which a randomly polarized laser beam is used as the laser beam.

Since the randomly polarized laser beam does not have a specific direction of polarization like the linearly polarized laser beams and the laser beam formed by combining the linearly polarized laser beams, the scanning direction of the laser beam can be easily adjusted. In addition, a cutting tool that has a cut surface having an appropriate uniform smoothness can be manufactured.

The above-described randomly polarized laser beam can be obtained by, for example, causing a laser beam to enter a fiber and pass through the fiber, and after that, causing the laser beam to be output through a collimator lens.

In the present invention, it is preferable that the laser beam have a wavelength of 532 nm or 355 nm.

If the wavelength is too long, the depth of a heat-affected (graphitized) layer of a processed surface of a cutting tool material may increase. On the other hand, if the wavelength is too short, the surface absorption may increase, and the processing speed may decrease. The wavelength of 532 nm or 355 nm is preferable, because, in this case, these problems will not occur.

Although a shallow heat-affected layer will be formed when the wavelength is one of these values, it can be easily removed by, for example, a method of separately radiating a defocused laser beam.

An example of a laser beam having the wavelength of 532 nm is a green laser beam, and an example of a laser beam having the wavelength of 355 nm is a UV laser beam. In particular, the green laser beam is preferable.

In the present invention, it is preferable that a cutting-edge ridgeline be formed by forming a horning surface on a ridge line along which a surface of the cutting tool material on a side where the laser beam enters and a processed surface of the cutting tool material processed by the laser beam intersect.

It was found that a horning surface is formed in an area in which a surface of a cutting tool material on a side where a laser beam enters and a processed surface of the cutting tool material that is processed by the laser beam intersect. Therefore, a cutting edge that has a cutting-edge ridgeline having an appropriate horning surface on a ridge line along which a surface of a cutting tool material on a side where a laser beam enters and a processed surface of the cutting tool material that is processed by the laser beam intersect can be effectively formed.

In the present invention, it is preferable that the curvature of the horning surface of the cutting-edge ridgeline be controlled by adjusting a relative position of the cutting tool material with respect to a focal position of the laser beam along an entering direction of the laser beam.

The relative position of the cutting tool material with respect to the focal position of the laser beam in the entering direction of the laser beam is adjusted, so that the curvature of a honed surface (the horning surface) of the cutting-edge ridgeline can be controlled, and a horning surface having a desired curvature can be obtained by a simple operation.

In the present invention, it is preferable that the curvature of the horning surface of the cutting-edge ridgeline be controlled by causing the laser beam to scan along a plurality of scanning lines that are parallel to one another and by adjusting the amount of cross-feed between adjacent scanning lines.

Since the intensity distribution of the laser beam is Gaussian distribution, the curvature of the horning surface of the cutting-edge ridgeline is controlled by causing the laser beam to scan along the plurality of scanning lines that are parallel to one another and by adjusting the amount of cross-feed (the amount of displacement) between the adjacent scanning lines, and as a result, a horning surface having a desired curvature can be easily obtained.

In the present invention, it is preferable that the curvature of the horning surface of the cutting-edge ridgeline be controlled by adjusting a beam diameter of the laser beam or a focal length of a converging lens.

As a method of controlling the curvature of the horning surface of the cutting-edge ridgeline, adjustment of a beam diameter or a focal length of a converging lens can be employed instead of adjustment of the relative position of the cutting tool material with respect to the focal position of the laser beam and adjustment of the amount of cross-feed between the adjacent scanning lines. Therefore, the number of parameters that can be controlled increases, and the degree of freedom becomes larger.

In the present invention, it is preferable that a ridge line along which a bottom surface of the cutting tool material on a side from which the laser beam exits and a processed surface of the cutting tool material processed by the laser beam intersect be a cutting-edge ridgeline.

Since a horning surface is not formed in an area in which a surface of the cutting tool material on the side from which the laser beam exits and the processed surface of the cutting tool material that is processed by the laser beam intersect, the cutting-edge ridgeline becomes sharper. Therefore, a cutting tool that has a sharp cutting-edge ridgeline can be manufactured by using a ridge line along which the surface of the cutting tool material on the side from which the laser beam exits and the processed surface of the cutting tool material that is processed by the laser beam intersect as a cutting-edge ridgeline.

In the present invention, it is preferable that the laser beam be a pulse laser beam having a pulse width in a range of 10 to 80 ns.

If the pulse width of the laser beam (the pulse laser beam) is too short, the processing speed may decrease. On the other hand, if the pulse width is too long, a heat-affected area may expand. The wavelength in a range of 10 to 80 ns is preferable, because, in this case, these problems are not likely to occur.

In the present invention, it is preferable that an assist gas be used when the laser cutting is performed.

Using an assist gas when performing laser cutting can facilitate the laser cutting, and attachment of substances that are scattered from the cutting tool material by laser beam irradiation to a lens or the like can be suppressed. Thus, a laser cutting can be performed with high precision. The assist gas is to be sprayed onto a portion that is irradiated with the laser beam through, for example, a nozzle.

In the present invention, it is preferable that the assist gas be nitrogen or argon.

Since an inert gas such as nitrogen or argon serves as a good shielding gas that suppresses attachment of substances that are vaporized from the cutting tool material to an objective lens or the like, laser cutting can be performed with high precision.

In the present invention, it is preferable that the assist gas be oxygen or compressed air.

Since oxygen and compressed air can generate $CO_2$ by reacting carbide that is generated by laser beam irradiation with oxygen, attachment of carbide to the cutting tool material can be suppressed.

In the present invention, it is preferable that the laser beam be converged by an objective lens.

An objective lens has a focal length shorter than that of a normal convex lens and a high light converging ability, and thus, processing performance will be improved. In addition, the focal depth can be shallow, and thus, the precision of surface roughness will be improved.

In the present invention, it is preferable that a laser beam whose intensity distribution be uniformed by using an optical element be used.

The cutting tool material (a workpiece) can be cut not only by a side face of the laser beam but also by vertically radiating the beam onto the cutting tool material by using an optical element that makes the intensity distribution of the laser beam uniform. Therefore, the degree of freedom of shapes that can be processed increases.

The present invention provides a cutting tool that is manufactured by using the above-described manufacturing method.

As described above, a cutting tool having a cut surface that is uniformly smooth can be provided.

It is preferable that the present invention be formed of a sintered compact mainly composed of diamond or cBN.

A cutting tool that is formed of a sintered compact mainly composed of diamond or cBN having high hardness is much better in functionality as a cutting tool and in durability and can notably provide advantageous effects of the present invention.

Note that, the term "mainly composed" refers to "to contain more than 50 wt % of diamond or cBN".

According to the present invention, there is provided a cutting tool manufacturing apparatus for manufacturing a cutting tool by cutting a cutting tool material into a predetermined shape by causing a laser beam to scan the cutting tool material, in which means for generating a combined laser beam formed of two linearly polarized laser beams, the directions of polarization of the two linearly polarized laser beams being at right angles to each other and an optical system that guides the combined laser beam to the cutting tool material are included.

As described above, a surface of a cut surface can be made uniformly smooth, and a cutting tool that has a stable performance can be easily manufactured by combining the two linearly polarized laser beams so that the directions of polarization of the laser beams are at right angles to each other. Operations can be further effectively performed by holding the cutting tool material with a multi-axis stage.

According to the present invention, there is provided a cutting tool manufacturing apparatus for manufacturing a cutting tool by cutting a cutting tool material into a predetermined shape by causing a laser beam to scan the cutting tool material, in which means for generating a circularly polarized laser beam and an optical system that guides the circularly polarized laser beam to the cutting tool material are included.

As described above, the scanning direction of the laser beam can be easily adjusted, and, in addition, a cutting tool that has a cut surface having an appropriate uniform smoothness can be manufactured by using the circularly polarized laser beam.

According to the present invention, there is provided a cutting tool manufacturing apparatus for manufacturing a cutting tool by cutting a cutting tool material into a predetermined shape by causing a laser beam to scan the cutting tool material, in which means for generating a randomly polarized laser beam and an optical system that guides the randomly polarized laser beam to the cutting tool material are included.

As described above, the scanning direction of the laser beam can be easily adjusted, and, in addition, a cutting tool that has a cut surface having an appropriate uniform smoothness can be manufactured by using the randomly polarized laser beam.

Advantageous Effects of Invention

According to the present invention, a cutting tool that has a cut surface whose surface is uniformly smooth and that have a stable performance, and a method and an apparatus for manufacturing the cutting tool can be provided. In addition, a method of easily manufacturing a cutting tool that has good horning processability can be provided.

DESCRIPTION OF EMBODIMENT

The present invention will be described below on the basis of an embodiment thereof.
1. Cutting Tool A cutting tool of the present embodiment is a ball end mill, and a cutting tool material made of diamond and cBN is preferably used as a material of a cutting edge of the ball end mill (a cutting tool material). A ball end mill includes a plurality of cutting edges. The cutting edges are brazed to a base part and a shank.

Figure 1:
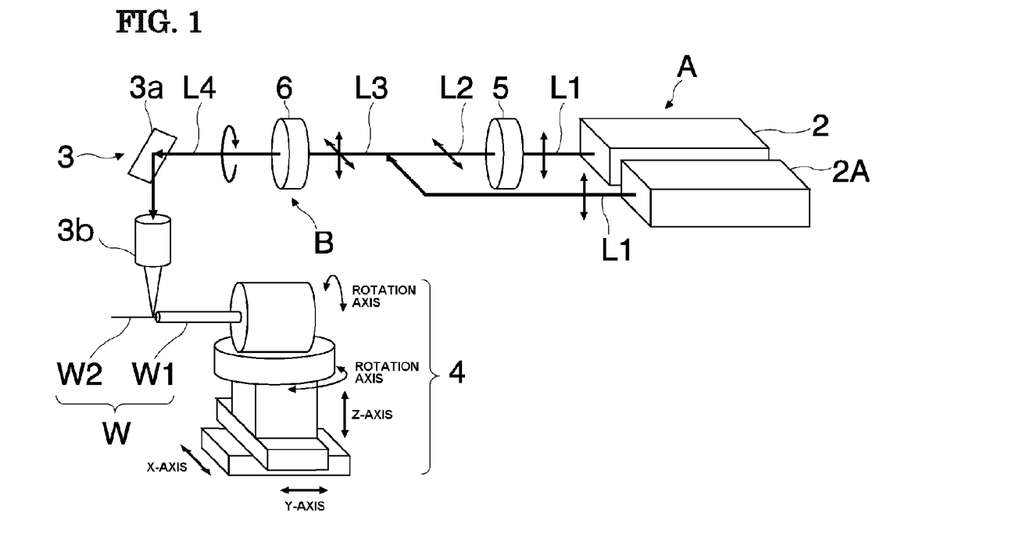
FIG. 1 is a diagram schematically showing a cutting tool manufacturing apparatus according to an embodiment of the present invention.

Single crystal diamond, polycrystalline diamond, vapor synthetic diamond, binderless sintered diamond or the like is used as the diamond.
2. Cutting Tool Manufacturing Apparatus
(1) Overall Configuration of Cutting Tool Manufacturing Apparatus FIG. 1 is a diagram schematically showing a cutting tool manufacturing apparatus according to an embodiment of the present invention. As shown in FIG. 1, a cutting tool manufacturing apparatus 1 includes means A for generating a combined laser beam formed by combining linearly polarized laser beams, the directions of polarization of which are different from each other, means B for generating a circularly polarized laser beam, an optical system 3 that guides a combined laser beam L3 to a cutting tool material W, a multi-axis stage 4, and control means (not shown) for causing the direction of polarization of one of linearly polarized laser beams L1 (or a linearly polarized laser beam L2) that is included in the combined laser beam L3 to be the same as the scanning direction of the laser beam. Bold line arrows in FIG. 2 indicate routes through which the laser beam passes and the travelling direction of the laser beam.
(2) Means for Generating Combined Laser Beam The means A for generating a combined laser beam includes two laser oscillators 2 and 2A and a λ/2 wave plate 5 that changes the direction of polarization of the linearly polarized laser beam L1 by 90 degrees.

Each of the linearly polarized laser beams L1 that exits from the corresponding one of the laser oscillators 2 and 2A is linearly polarized light, the direction of the electric field of which is linearly oriented in a vertical direction. The linearly polarized laser beam L1 that exits from the laser oscillator 2 becomes the linearly polarized light beam L2 as a result of rotating the direction of polarization of the linearly polarized laser beam L2 by 90 degrees to be oriented in a horizontal direction while passing through the λ/2 wave plate 5. These linearly polarized laser beams L1 and L2 are combined, the combined laser beam L3 is guided to the cutting tool material W by the optical system 3, and the cutting tool material W is cut at a predetermined scanning speed.

Although a green laser beam having a wavelength of 532 nm is used as the linearly polarized laser beam L1 in the present embodiment, a UV laser beam having a wavelength of 355 nm can be used. The pulse width generated in the laser oscillators 2 and 2A is adjusted to be within a range of 10 to 80 ns.

(3) Means for Generating Circularly Polarized Laser Beam

The means B for generating a circularly polarized laser beam includes a λ/4 wave plate 6 and a mechanism part, which is not shown in the figure, and that positions the λ/4 wave plate 6 so that the λ/4 wave plate 6 is able to be moved into and out of an optical path of the laser beam. The combined laser beam L3 is circularly polarized by causing the λ/4 wave plate 6 to move into the optical path. Then, this circular polarized light laser beam L4 is guided to the cutting tool material W by the optical system 3, and the cutting tool material W is cut.

(4) Optical System

The optical system 3 includes a mirror 3a and an objective lens 3b. The objective lens 3b converges a pulse laser beam that is reflected from the mirror 3, and radiates the pulse laser beam onto the cutting tool material W held by the multi-axis stage 4.

(5) Multi-Axis Stage

The multi-axis stage 4 holds an end portion of a base part W1 of the cutting tool material W and allows a laser beam to be radiated onto any point of the cutting tool material W from any direction and in order to allow an irradiation position of the laser beam to be moved in a scanning manner during laser beam irradiation.

For example, in the case of a multi-axis stage having five axes shown in FIG. 1, laser cutting can be performed while the cutting tool material W is moved parallel to the X-axis, the Y-axis, and the Z-axis directions and rotated around two rotation axes. The irradiation position of the laser beam can be moved in a scanning manner by the parallel movements in the X-axis and the Y-axis directions, the rotational movement, or a combination of such movements during the laser beam irradiation.

A relative positional relationship between the focal point of the laser beam in the thickness direction of the cutting tool material W (the vertical direction in FIG. 1) and the cutting tool material 3 can be adjusted by moving the cutting tool material W parallel to the Z-axis direction.

(6) Assist Gas Supply Means

Assist gas supply means (not shown) is provided in the cutting tool manufacturing apparatus 1. More specifically, for example, a nozzle that sprays an assist gas such as an inert gas such as nitrogen, argon, or the like, oxygen, or compressed air onto a portion W2 (a tip portion) of the cutting tool material W that is to be irradiated with a laser beam and an assist gas supply apparatus that supplies the assist gas to the nozzle at a predetermined pressure and flow rate are provided. As a result, attachment of substances scattered from the cutting tool material by laser beam irradiation to a lens or the like can be suppressed, and laser cutting can be performed with high precision.

3. Method of Laser Cutting

Next, a method of laser cutting using the cutting tool manufacturing apparatus 1 will be described.

(1) Cutting

Figure 2:
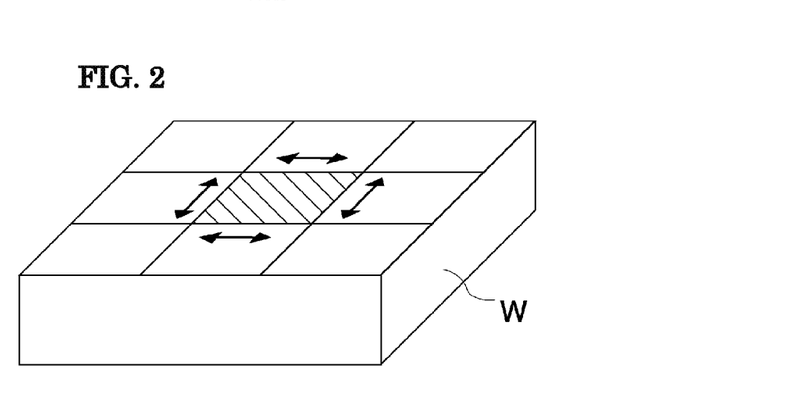
FIG. 2 is a diagram showing the state of a cutting tool material on a side where a laser beam enters and on a side from which the laser beam exits in a cutting tool manufacturing method according to an embodiment of the present invention.

FIG. 2 is a diagram showing scanning lines of the laser beam and the directions of polarization of the laser beam in the cutting tool manufacturing method according to the embodiment of the present invention. As shown in FIG. 2, when manufacturing a cutting edge having a square shape by laser cutting, a cutting tool material is cut by radiating the laser beam onto a surface of the cutting tool material while repeatedly reciprocating the laser beam. The laser beam scans along an outline in a square shape. It is preferable that the scanning speed be in a range of 0.001 to 50 mm/sec.

In this case, the scanning direction of the combined laser beam L3, that is, the cutting direction of the cutting tool material W and the direction of polarization of one of the linearly polarized laser beams L1 (or the linearly polarized laser beam L2) that is included in the combined laser beam L3 are controlled so as to be the same as each other. Because of this, cutting can be smoothly performed along the whole outline in a square shape, and a cutting tool that has good performance can be manufactured. The arrows in FIG. 2 indicate the direction of polarization (the oscillation direction) of the linearly polarized laser beam that is the same as the cutting direction of the cutting tool material W.

(2) Control of Curvature of Horning Surface by Horning

Figure 3:
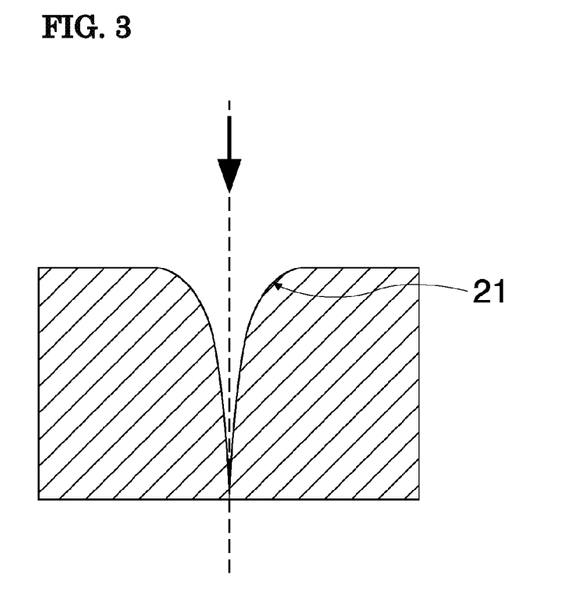
FIG. 3 is a diagram showing scanning lines of the laser beam and the directions of polarization of the laser beam in the cutting tool manufacturing method according to the embodiment of the present invention.

FIG. 3 is a diagram showing the state of a cutting tool material on a side where a laser beam enters and on a side from which the laser beam exits in a cutting tool manufacturing method according to the embodiment of the present invention. The down arrow in FIG. 3 indicates the entering direction of the laser beam. As shown in FIG. 3, a horning surface 21 is formed on a side where a laser beam enters by radiating the laser beam onto the cutting tool material W. On the other hand, a horning surface is not formed on a side from which the laser beam exits, and thus, the ridge line becomes sharp.

As a method of controlling the curvature of the horning surface 21, which is formed on the side where the laser beam enters as described above, a method of adjusting the defocus amount Z or a method of adjusting the amount of cross-feed (the amount of displacement) is employed.

(a) Method of Adjusting Defocus Amount Z

Figure 4:
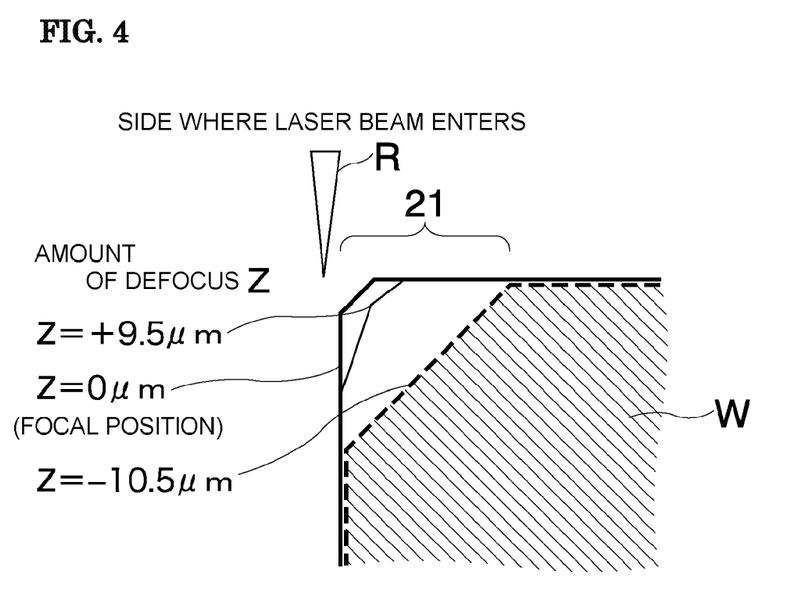
FIG. 4 is a cross-sectional view explaining a method of controlling the curvature of a horning surface by adjusting a focal position of the laser beam with respect to the thickness direction of the cutting tool material.

This method is a method of adjusting the focal position of the laser beam with respect to the thickness direction of the cutting tool material. FIG. 4 is a cross-sectional view schematically showing a method of controlling the curvature of the horning surface 21 by adjusting the defocus amount Z.

As shown in FIG. 4, the curvature of the horning surface 21 of the cutting-edge ridgeline can be controlled by adjusting a relative position of the cutting tool material with respect to the focal position of the laser beam. When the focal point is shallow (e.g., Z=+9.5 μm), the radius of curvature decreases compared to when Z=0 (the focal position), and when the focal point is deep (e.g., Z=−10.5 μm), the radius of curvature increases compared to when Z=0.

(b) Method of Adjusting Amount of Cross-Feed

Figure 5:
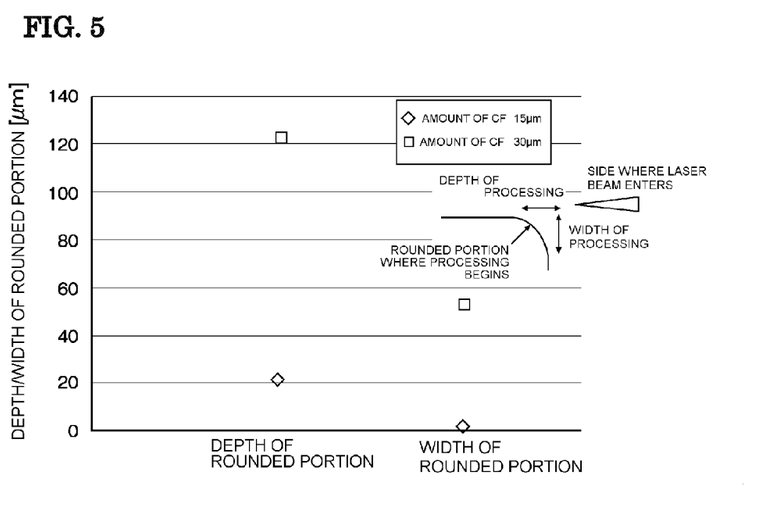
FIG. 5 is a cross-sectional view explaining a method of controlling the curvature of a flank face by adjusting the amount of cross-feed.

This method is a method of controlling the curvature of the horning surface of the cutting-edge ridgeline by adjusting the amount of cross-feed (the amount of CF) between adjacent scanning lines of a plurality of scanning lines of the laser beam that are parallel to one another. FIG. 5 is a diagram showing a relationship between the amount of CF and the depth of a rounded horning portion (the process depth) and the width of the rounded horning portion (the process width). In FIG. 5, when the amount of CF is 15 μm, the process depth and the process width are 21 μm and 1 μm, respectively. When the amount of CF is 30 μm, the process depth and the process width are 122 μm and 55 μm, respectively. This shows that the amount of CF is significantly reflected in the process depth and the process width.

(3) Selection of Cutting-Edge Ridgeline

As described above, since the horning surface is formed on the side where the laser beam enters, when forming a rounded cutting-edge ridgeline, the side where the laser beam enters is used as the cutting-edge ridgeline. A horning surface is not formed on the side from which the laser beam exits, and a ridge line of a surface and a cut surface of the cutting tool becomes sharp, and thus, when a sharp cutting-edge ridgeline is formed, the side where the laser beam enters is the cutting-edge ridgeline.

EXAMPLE

Example and Comparative Example

1. Cutting Tool Manufacturing Apparatus

The cutting tool manufacturing apparatus shown in FIG. 1 was used in the present example and a comparative example. As a laser beam generating apparatus, two Q-switched pulse $YVO_4$ lasers having a wavelength of 532 nm, 14 W, and a pulse width of 23 ns were used. As an objective lens (a converging lens), a 5× objective lens (manufactured by Mitutoyo Corporation, M Plan Apo Nir 5× with a focal length of 40 mm) was used. Nitrogen was used as an assist gas.

2. Cutting Tool Material (Cutting Tool Material)

Single crystal diamond having a thickness of 0.7 mm was used as a cutting tool material.

3. Laser Cutting (1) The example is an example of laser cutting performed in a rectangular shape on a cutting tool material formed of single crystal diamond using a circularly polarized laser beam.
(2) The comparative example is an example of laser cutting performed in a rectangular shape on a cutting tool material formed of single crystal diamond using one linearly polarized laser beam. In the comparative example, one side of the cutting tool material having a rectangle shape was cut by causing the scanning direction of the laser beam to be a direction perpendicular to the direction of polarization of the laser beam, and the other sides that are adjacent to the one side were cut by causing the scanning direction of the laser beam and the direction of polarization of the laser beam to be perpendicular to each other.

4. Measurement of Surface Roughness (1) Measuring Method

Surface roughness Rz (ten-point medium height: μm) of samples of the example and the comparative example were measured using a laser microscope.
(2) Measurement Results Measurement results are shown in Table I. Note that, in the Table I, the direction parallel to the direction of polarization of the laser beam is the X-axis, and the direction perpendicular to the X-axis is the Y-axis.

TABLE I

| | Surface roughness Rz (μm) | |
|---|---|---|
| | Surface processed in X-axis direction | Surface processed in Y-axis direction |
| Example | 4 to 9 | 4 to 9 |
| Comparative example | 17 to 49 | 16 to 20 |

Table I shows that, a surface processed in the X-axis direction and a surface processed in the Y-axis direction both have sufficiently small surface roughness Rz in the example. It is assumed that the surface roughness Rz in the Y-axis direction is better that in the X-axis direction in both the example and the comparative example because the processing speed in the vertical direction (an electric field oscillation surface) is faster than that in the direction of polarization of the laser beam (a magnetic field oscillation surface).

5. Relationship Between Pulse Width of Laser Beam and Processability

Next, a relationship between a pulse width of the laser beam and smoothness of a cut surface was examined by changing the pulse width to various values. As a result of the examination, it was found that when the pulse width is in a range of 10 to 80 ns, no heat-affected layer is generated, a narrow and deep process width can be formed, and a cut surface having good smoothness can be formed.

Figure 6:
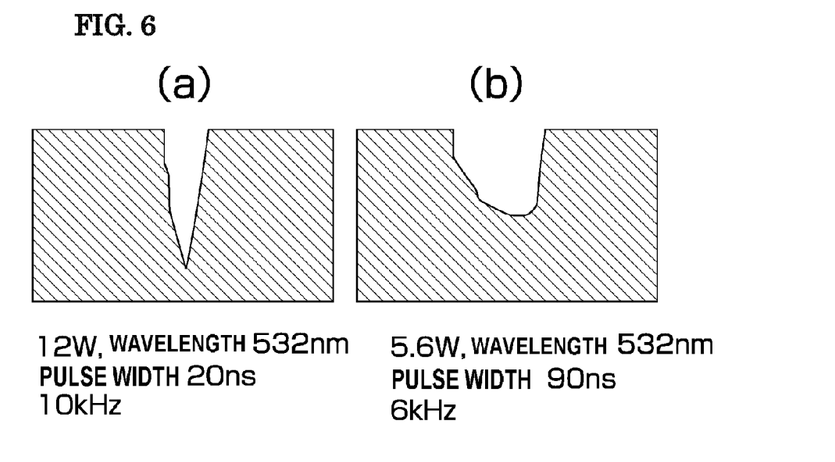
FIG. 6 is a diagram schematically showing a relationship between the pulse width of the laser beam and processability.

FIG. 6 shows some of the measurement results. As shown in FIG. 6(*a*), in the case of a laser beam having an output power of 12 W, a wavelength of 532 nm, a frequency of 10 kHz, and a pulse width of 20 ns, a narrow and deep process width is formed, and a cut surface having good smoothness can be formed. On the other hand, as shown in FIG. 6(*b*), in the case of a laser beam having an output power of 5.6 W, a wavelength of 532 nm, a frequency of 6 kHz, and a pulse width of 90 ns, a shallow and wide process width is formed, and thus, a cut surface having good smoothness cannot be formed.

6. Relationship Between Amount of Cross-Feed and Horning Processability

Next, a relationship between the amount of cross-feed between adjacent scanning lines of scanning lines of the laser beam and the curvature of the rounded horning portion (the curvature of the ridge line) (the calculated value) was examined by changing the amount of cross-feed to various values. As a result of the examination, as shown in Table II, it was found that the curvature of the ridge line increases as the amount of cross-feed decreases. Therefore, it was found that the curvature of a ridge line of a cutting tool can be adjusted by adjusting the amount of cross-feed.

TABLE II

| Amount of cross-feed (μm) | 15 | 20 | 25 | 30 |
|---|---|---|---|---|
| Curvature of ridge line (μm) | 21.6 | 10.6 | 5.2 | 2.5 |

7. Relationship Between Amount of Defocus and Horning Processability

Next, a relationship between the amount of defocus of scanning lines of the laser beam and the curvature of the rounded horning portion (the curvature of the ridge line) (the measured value) was examined by changing the amount of defocus to various values. As a result of the examination, as shown in Table III, it was found that the curvature of the ridge line increases as the amount of defocus increases. Therefore, it was found that the curvature of a ridge line of a cutting tool can be adjusted by adjusting the amount of defocus.

TABLE III

| Amount of defocus (μm) | 100 | 200 |
|---|---|---|
| Curvature of ridge line (μm) | 5.6 | 9.3 |

8. Relationship Between Beam Diameter of Laser Beam and Focal Length of Lens and Horning Processability Next, a relationship between a beam diameter of a laser beam and a focal length of a lens and the curvature of the rounded horning portion (the curvature of the ridge line) (the calculated value) was examined by changing the beam diameter of the laser beam and the focal length of the lens to various values. As a result of the examination, as shown in Table IV, it was found that the curvature of a processed ridge line increases as the beam diameter of the laser beam decreases, and the curvature of a processed ridge line decreases as the focal length of the lens decreases. Therefore, it was found that the curvature of a ridge line of a cutting tool can be adjusted by adjusting a beam diameter of a laser beam and a focal length of a lens.

TABLE IV

| Beam diameter of laser beam (mm) | 3 | 2.4 | 1.8 | 3 |
|---|---|---|---|---|
| Focal length of lens (mm) | 40 | 40 | 40 | 20 |
| Curvature of ridge line (μm) | 21.6 | 27.1 | 36.1 | 10.8 |

Although the present invention has been described above on the basis of an embodiment thereof, the present invention is not limited to the above-described embodiment. Various changes can be made to the above-described embodiment in a range equivalent or equal to the present invention.

REFERENCE SIGNS LIST 1 cutting tool manufacturing apparatus
2, 2A laser beam generating apparatus
3 optical system
3a mirror
3b objective lens
4 multi-axis stage
5 ½ λ wave plate
6 ¼ λ wave plate
21 horning surface
A means for generating combined laser beam
B means for generating circularly polarized laser beam
L1, L2 linearly polarized laser beam
L3 combined laser beam
L4 circularly polarized laser beam
W cutting tool material
W1 base part of cutting tool material
W2 portion of cutting tool material to be irradiated with laser beam

The invention claimed is:

1. A cutting tool manufacturing method for manufacturing a cutting tool, the method comprising:
cutting a cutting tool material into a predetermined shape by causing a laser beam to scan the cutting tool material,
wherein a cutting-edge ridgeline is formed by forming a horning surface on a ridge line along which a surface of the cutting tool material on a side where the laser beam enters and a processed surface of the cutting tool material processed by the laser beam intersect, and
wherein the cutting tool material is cut by using, as the laser beam, a laser beam formed by combining two linearly polarized laser beams so that the directions of polarization of the two linearly polarized laser beams are at right angles to each other.

2. The cutting tool manufacturing method according to claim 1,
wherein a circularly polarized laser beam is used as the laser beam.

3. The cutting tool manufacturing method according to claim 1,
wherein a randomly polarized laser beam is used as the laser beam.

4. The cutting tool manufacturing method according to claim 1, wherein the laser beam has a wavelength of 532 nm or 355 nm.

5. The cutting tool manufacturing method according to claim 1, wherein a curvature of the horning surface of the cutting-edge ridgeline is controlled by adjusting a relative position of the cutting tool material with respect to a focal position of the laser beam along an entering direction of the laser beam.

6. The cutting tool manufacturing method according to claim 1, wherein a curvature of the horning surface of the cutting-edge ridgeline is controlled by causing the laser beam to scan along a plurality of scanning lines that are parallel to one another and by adjusting the amount of cross-feed between adjacent scanning lines.

7. The cutting tool manufacturing method according to claim 1, wherein a curvature of the horning surface of the cutting-edge ridgeline is controlled by adjusting a beam diameter of the laser beam or a focal length of a converging lens.

8. The cutting tool manufacturing method according to claim 1, wherein the laser beam is a pulse laser beam having a pulse width in a range of 10 to 80 ns.

9. The cutting tool manufacturing method according to claim 1, wherein an assist gas is used when the laser cutting is performed.

10. The cutting tool manufacturing method according to claim 1, wherein a laser beam whose intensity distribution is made uniform by using an optical element is used.

* * * * *